United States Patent
Takatani

(10) Patent No.: US 9,360,912 B2
(45) Date of Patent: Jun. 7, 2016

(54) SHUTDOWN PROCESSING MODE WITH FORCIBLE POWER OFF

(71) Applicant: CANON KABUSHIKI KAISHA, Tokyo (JP)

(72) Inventor: Tamotsu Takatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/284,226

(22) Filed: May 21, 2014

(65) Prior Publication Data
US 2014/0258753 A1 Sep. 11, 2014

Related U.S. Application Data

(62) Division of application No. 12/837,891, filed on Jul. 16, 2010, now abandoned.

(30) Foreign Application Priority Data

Jul. 31, 2009 (JP) .................... 2009-178770

(51) Int. Cl.
| | |
|---|---|
| G06F 1/32 | (2006.01) |
| G06F 1/00 | (2006.01) |
| G06F 9/00 | (2006.01) |
| G06F 9/24 | (2006.01) |
| G06F 11/00 | (2006.01) |
| G06F 11/07 | (2006.01) |
| H04N 1/00 | (2006.01) |
| G06F 9/44 | (2006.01) |
| G06F 11/14 | (2006.01) |
| G06F 1/24 | (2006.01) |

(52) U.S. Cl.
CPC ............... *G06F 1/32* (2013.01); *G06F 1/3228* (2013.01); *G06F 11/0757* (2013.01); *H04N 1/00896* (2013.01); *G06F 1/24* (2013.01); *G06F 1/3234* (2013.01); *G06F 1/3284* (2013.01); *G06F 9/4401* (2013.01); *G06F 9/4403* (2013.01); *G06F 9/4418* (2013.01); *G06F 11/1417* (2013.01); *G06F 11/1438* (2013.01); *G06F 11/1441* (2013.01)

(58) Field of Classification Search
None
See application file for complete search history.

(56) References Cited

U.S. PATENT DOCUMENTS

| | | | | |
|---|---|---|---|---|
| 6,820,197 | B2 * | 11/2004 | Benedix et al. ............ | 713/1 |
| 7,516,315 | B2 * | 4/2009 | Wood et al. ............... | 713/1 |
| 2002/0188838 | A1 * | 12/2002 | Welder ..................... | 713/2 |

(Continued)

FOREIGN PATENT DOCUMENTS

| | | |
|---|---|---|
| JP | 2001-014069 A | 1/2001 |
| JP | 2003-032400 A | 1/2003 |

(Continued)

*Primary Examiner* — Ji H Bae
(74) *Attorney, Agent, or Firm* — Canon U.S.A., Inc., IP Division

(57) ABSTRACT

An information processing apparatus includes a selection unit configured to select a mode of processing to be executed when a power supply state of the information processing apparatus is shifted from a first power supply state to a second power supply state, a determination unit configured to determine time necessary for executing the processing based on the mode selected by the selection unit, an execution unit configured to execute the processing in the mode selected by the selection unit, and a control unit configured to control the execution unit to execute the processing again when the processing has not been completed within the time determined by the determination unit.

8 Claims, 6 Drawing Sheets

(56) References Cited

U.S. PATENT DOCUMENTS

| | | | |
|---|---|---|---|
| 2003/0005277 A1* | 1/2003 | Harding et al. | 713/2 |
| 2003/0028628 A1* | 2/2003 | Irwin et al. | 709/222 |
| 2004/0078679 A1* | 4/2004 | Cagle et al. | 714/36 |
| 2005/0081074 A1* | 4/2005 | Chheda et al. | 713/320 |
| 2006/0056312 A1* | 3/2006 | Yoshida | 370/252 |
| 2008/0082808 A1* | 4/2008 | Rothman et al. | 713/1 |
| 2008/0155332 A1* | 6/2008 | Landers et al. | 714/36 |
| 2008/0276132 A1* | 11/2008 | Majewski et al. | 714/55 |
| 2009/0055671 A1* | 2/2009 | Kim et al. | 713/323 |
| 2009/0228695 A1* | 9/2009 | Pathak | 713/1 |

FOREIGN PATENT DOCUMENTS

| | | |
|---|---|---|
| JP | 2004-054616 A | 2/2004 |
| JP | 2004-262065 A | 9/2004 |
| JP | 2006-155239 A | 6/2006 |
| JP | 2006-221381 A | 8/2006 |
| JP | 2009-070224 A | 4/2009 |
| WO | 2005/085979 A1 | 9/2005 |
| WO | 2007/013512 A1 | 2/2007 |

* cited by examiner

FIG. 3A

| MODE | MONITORING TIME |
|---|---|
| NORMAL | 30 SEC |
| INITIALIZATION | 180 SEC |

FIG. 3B

| MODE | MONITORING TIME |
|---|---|
| NORMAL | 30 SEC |
| COMPLETE ERASURE | 1800 SEC |
| RECOVERY | 3600 SEC |

FIG. 3C

| MODE | MONITORING TIME |
|---|---|
| NORMAL | 10 SEC |
| TEMPERATURE REGULATION | 30 SEC |
| CALIBRATION | 30 SEC |

SHUTDOWN PROCESSING MODE WITH FORCIBLE POWER OFF

CROSS REFERENCE OF RELATED APPLICATIONS

This application is a Divisional of U.S. patent application Ser. No. 12/837,891 filed on Jul. 16, 2010 which claims the benefit of Japanese Patent Application No. 2009-178770 filed Jul. 31, 2009, which is hereby incorporated by reference herein in its entirety.

BACKGROUND OF THE INVENTION

1. Field of the Invention

The present invention relates to an information processing apparatus, a method for controlling the information processing apparatus, and a control program.

2. Description of the Related Art

There is an information processing apparatus which executes processing to shift a power supply state from one power supply state to another power supply state. The shift processing includes, for example, startup processing, shutdown processing, power saving shift/return processing, and the like (details of each processing will be described below in exemplary embodiments).

In Japanese Patent Application Laid-Open No. 2008-182580, it is discussed that in an information processing apparatus, when power saving shift processing is not completed within predetermined monitoring time, the information processing apparatus is restarted and the power saving shift processing is executed again.

However, there is an information processing apparatus which has a plurality of modes different in shifting time even if it is the same type of shift processing. A mode of startup processing may include, for example, a normal mode, an initialization mode, and the like (details of each mode will be described below in exemplary embodiments). A mode of shutdown processing may include, for example, a normal mode, a complete erasure mode, a recovery mode, and the like (details of each mode will be described below in exemplary embodiments). A mode of power saving shift/return processing may include, for example, a normal mode, a temperature regulation mode, a calibration mode, and the like (details of each mode will be described below in exemplary embodiment).

In Japanese Patent Application Laid-Open No. 2008-182580, one monitoring time is constantly used. Thus, when a plurality of modes different in shifting time is present as the mode of shift processing, suitable monitoring time cannot be determined corresponding to each mode. For example, if the monitoring time is shortened in accordance with a mode whose shifting time is short and when shift processing is executed in a mode whose shifting time is long, even when the shift processing is normally executed, the shift processing is executed again. Further, for example, if the monitoring time is lengthened in accordance with the mode whose shifting time is long and when shift processing is executed in the mode whose shifting time is short, if the shift processing is stopped on the way, time until the shift processing is executed again may lengthen.

SUMMARY OF THE INVENTION

The present invention is directed to an information processing apparatus in which suitable monitoring time is determined corresponding to a mode of shift processing and the shift processing is executed again when the shift processing is not completed within the monitoring time.

According to an aspect of the present invention, an information processing apparatus includes a selection unit configured to select a mode of processing to be executed when a power supply state of the information processing apparatus is shifted from a first power supply state to a second power supply state, a determination unit configured to determine time necessary for executing the processing based on the mode selected by the selection unit, an execution unit configured to execute the processing in the mode selected by the selection unit, and a control unit configured to control the execution unit to execute the processing again when the processing has not been completed within the time determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A to 3C are tables illustrating correspondence between each mode of shift processing and monitoring time of the shift processing.

DESCRIPTION OF THE EMBODIMENTS

Various exemplary embodiments, features, and aspects of the invention will be described in detail below with reference to the drawings.

Figure 1:
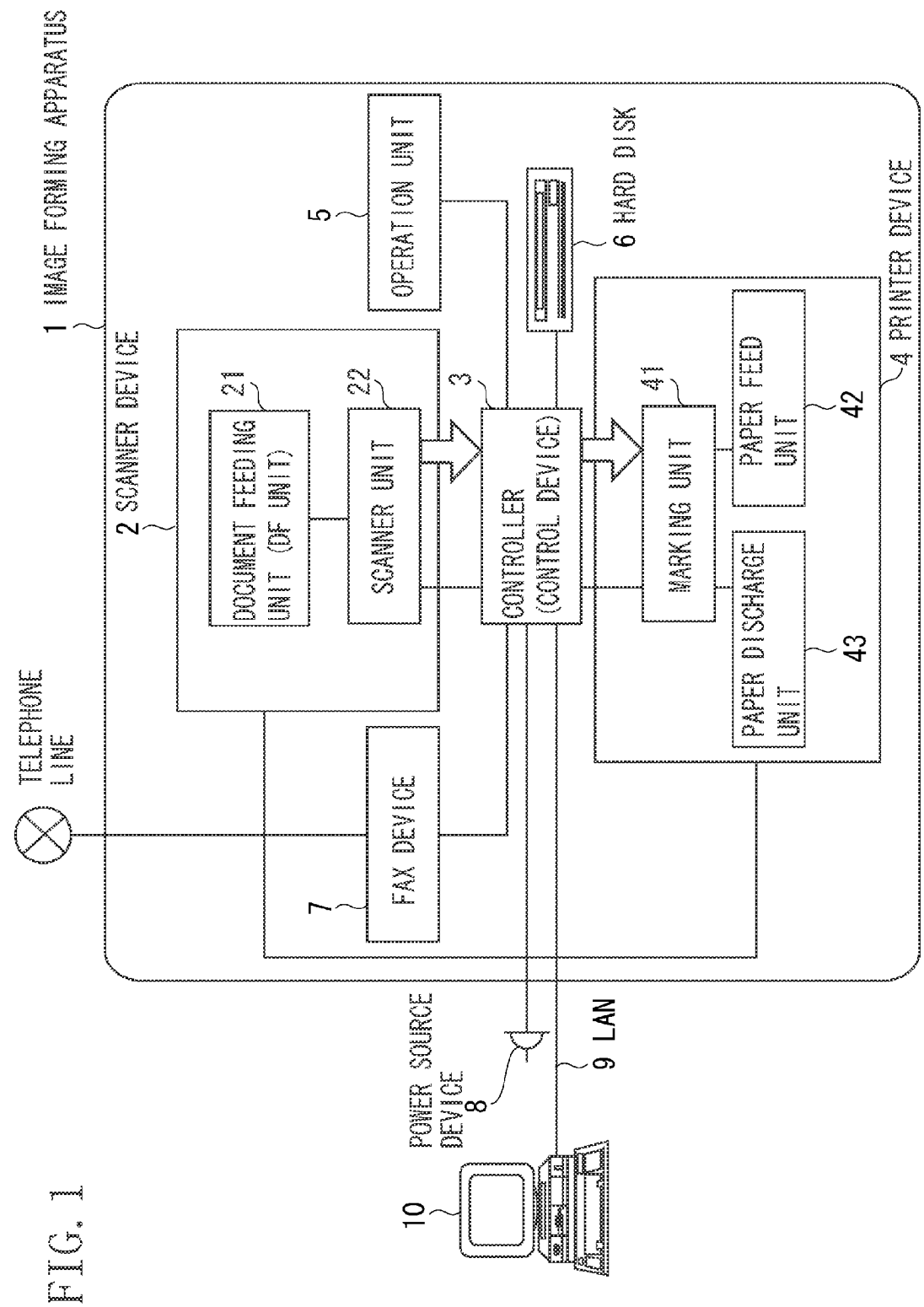
FIG. 1 is a block diagram illustrating a configuration of an image forming apparatus.

FIG. 1 is a block diagram illustrating a configuration of an image forming apparatus according to a first exemplary embodiment. In the present exemplary embodiment, an image forming apparatus will be described as an example of an information processing apparatus. However, the information processing apparatus may also be an apparatus other than the image forming apparatus.

An image forming apparatus 1 is connected with a power source device 8. The image forming apparatus 1 can execute input and output of a digital image from a computer 10 via a local area network (LAN) 9, issue of a job, a command to devices, and the like.

The image forming apparatus 1 can execute various jobs. An example will be described below.

The image forming apparatus 1 can execute a copy function of recording an image read from a scanner device 2 on a hard disk drive (HDD) 6 and simultaneously executing printing using a printer device 4. Further, the image forming apparatus 1 can execute an image transmission function of transmitting an image read from the scanner device 2 to the computer 10 via the LAN 9.

Furthermore, the image forming apparatus 1 can execute an image storage function of recording an image read from the scanner device 2 on the HDD 6, and executing image transmission and image printing as needed. Still furthermore, the image forming apparatus 1 can execute an image print function of analyzing, for example, a page description language transmitted from the computer 10 and printing it by the printer device 4.

The scanner device 2 optically reads an image from a document to convert it into a digital image. The scanner device 2 includes a document feeding unit 21 capable of automatically successively changing a bundle of documents and a scanner unit 22 capable of optically scanning the document and converting scanned data into a digital image. The converted image data is transmitted to a controller 3.

The controller 3 includes a hardware resource which will be described below and issues a command to each stored module, thereby executing a job on the image forming apparatus. As described below, the controller 3 executes control to shift a power supply state from the power source device 8 to any power mode of a plurality of power modes. Further, the controller 3 executes predetermined restart processing to the power source device 8 by turning on power again from the power source device 8.

The printer device 4 outputs a digital image to a paper device. The printer device 4 includes a marking unit 41 configured to print image data on fed paper, a paper feed unit 42 capable of successively feeding from a bundle of paper sheets one by one, and a paper discharge unit 43 configured to discharge the paper after printing.

An operation unit 5 receives an operation to the image forming apparatus to display a state of the image forming apparatus. The HDD 6 stores a digital image, a control program, and the like. A facsimile (FAX) device 7 executes transmission or reception of a digital image to and from a telephone line or the like. The power source device 8 supplies power to the controller 3, the scanner device 2, and the printer device 4.

Figure 2:
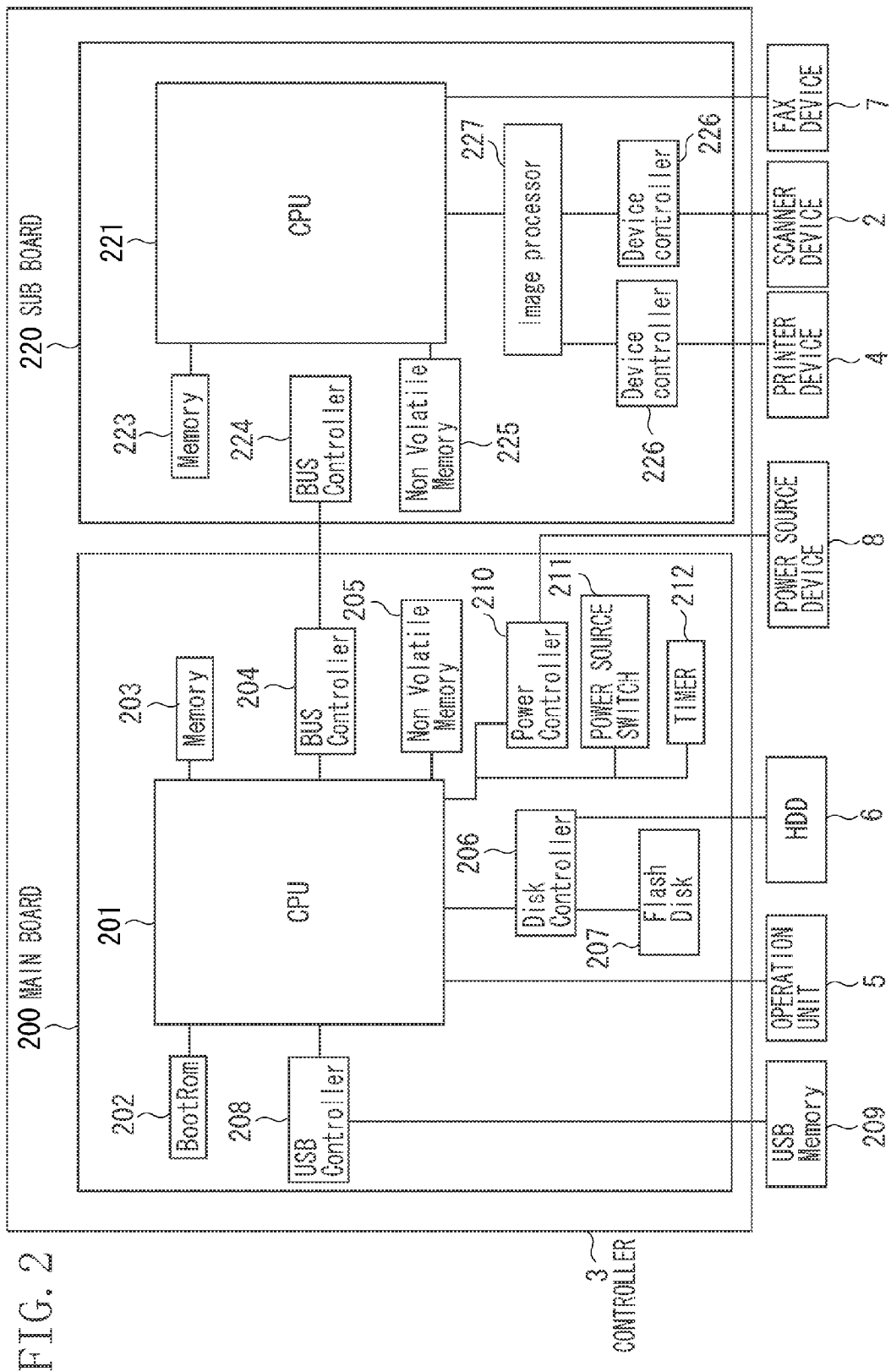
FIG. 2 is a block diagram illustrating a configuration of a controller.

FIG. 2 is a block diagram illustrating a detail configuration of the controller 3 illustrated in FIG. 1. In FIG. 2, a hardware resource is simplified and illustrated. Accordingly, for example, a central processing unit (CPU) 201, and a CPU 221 include CPU peripheral hardware such as a chip set, a bus bridge, and a clock generator in large numbers. However, these are omitted.

The controller 3 includes a main board 200 and a sub board 220. The main board 200 is a general purpose CPU system. The main board 200 is externally connected with a universal serial bus (USB) memory 209, the operation unit 5, the HDD 6, the power source device 8, and the like.

The main board 200 includes the CPU 201 for controlling the whole board, a read only memory (ROM) 202 including a boot program, and a memory 203 to be used by the CPU as a work memory. Further, the main board 200 includes a bus controller 204 having a bridge function with an external bus, a nonvolatile memory 205 which is not erased when a power source is intercepted, and a disk controller 206 for controlling a storage device.

Furthermore, the main board 200 includes a flash disk (solid state disk (SSD) etc.) 207 which is a storage device configured by a semiconductor device and having a relatively small capacity, a USB controller 208 capable of controlling the USB, and the like. Still furthermore, the main board 200 includes a power source control unit 210 configured to control power supply from the power source device 8 to each component of the image forming apparatus 1, a power source switch 211 for inputting an instruction to turn on/off the power source from a user, and a timer 212 to be used for power source control.

The sub board 220 includes a relatively small general purpose CPU system and image processing hardware. Each of the scanner device 2 and the printer device 4 outside executes transmission and reception of digital image data via a device controller 226. The FAX device 7 is directly controlled by the CPU 221.

The sub board 220 includes the CPU 221 for controlling the whole board, the memory 203 to be used by the CPU 221 as a work memory, and a bus controller 224 having a bridge function with an external bus. Further, the sub board 220 includes a nonvolatile memory 225 which is not erased when a power source is intercepted, the device controller 226, and an image processing processor 227 for executing real time digital image processing.

FIGS. 3A to 3C are tables illustrating correspondence between each mode of shift processing and monitoring time of the shift processing. These tables are stored in the nonvolatile memory 205.

FIG. 3A is a table illustrating correspondence between each mode of startup processing and monitoring time of the startup processing when a power source is turned on.

A normal mode is a mode of startup processing when initialization processing needed in first startup of the image forming apparatus 1 is already completed. An initialization mode is a mode of startup processing when initialization processing needed in the first startup of the image forming apparatus 1 is not still completed.

More specifically, in the initialization mode, when startup processing is executed, it is necessary for the image forming apparatus 1 to execute initialization processing in addition to the processing in the normal mode. Accordingly, since time of startup processing is longer in the initialization mode than in the normal mode, monitoring time of startup processing is also determined with time longer in the initialization mode than in the normal mode.

FIG. 3B is a table illustrating correspondence between each mode of shutdown processing and monitoring time of the shutdown processing.

A normal mode is a mode of shutdown processing when complete erasure of data and recovery of mirroring are not executed on the HDD 6. A complete erasure mode is a mode of shutdown processing when complete erasure of data (processing for overwriting other data when data is erased) is executed on the HDD 6. A recovery mode is a mode of shutdown processing when recovery of mirroring (processing, when one HDD is replaced by mirroring, for writing data on another HDD on the HDD) is executed on the HDD 6.

In other words, in the complete erasure mode or the recovery mode, when shutdown processing is executed complete erasure of data or recovery of mirroring are needed to be executed on the HDD 6 in addition to the processing in the normal mode. Accordingly, since time of shutdown processing is longer in the complete erasure mode or the recovery mode than in the normal mode, monitoring time of shutdown processing is also determined with time longer in the complete erasure mode or the recovery mode than in the normal mode.

FIG. 3C is a table illustrating correspondence between each mode of power saving shift/return processing and monitoring time of power saving shift/return processing when shifting to or returning from the power saving.

A normal mode is a mode of power saving shift/return processing when temperature regulation and calibration are not executed on the printer device 4 in executing the power saving shift/return processing. A temperature regulation mode is a mode of the power saving shift/return when temperature regulation is executed on the printer device 4 in executing the power saving shift/return processing. A calibration mode is a mode of the power saving shift/return when calibration is executed on the printer device 4 in executing the power saving shift/return processing.

In other words, in the temperature regulation mode and the calibration mode, when the power saving shift/return processing is executed, the temperature regulation and the calibration are needed to be executed on the printer device 4 in addition to the processing in the normal mode. Accordingly, since time of the power saving shift/return processing is longer in the temperature regulation mode and the calibration than in the normal mode, monitoring time of the power saving shift/return processing is also determined with time longer in the temperature regulation mode and the calibration mode than in the normal mode.

In the present exemplary embodiment, power control when a power source is turned on, in other words, power control from when the power source is turned off (first power supply state) to when the power source is turned on (second power supply state) in the image forming apparatus will be described.

Figure 4:
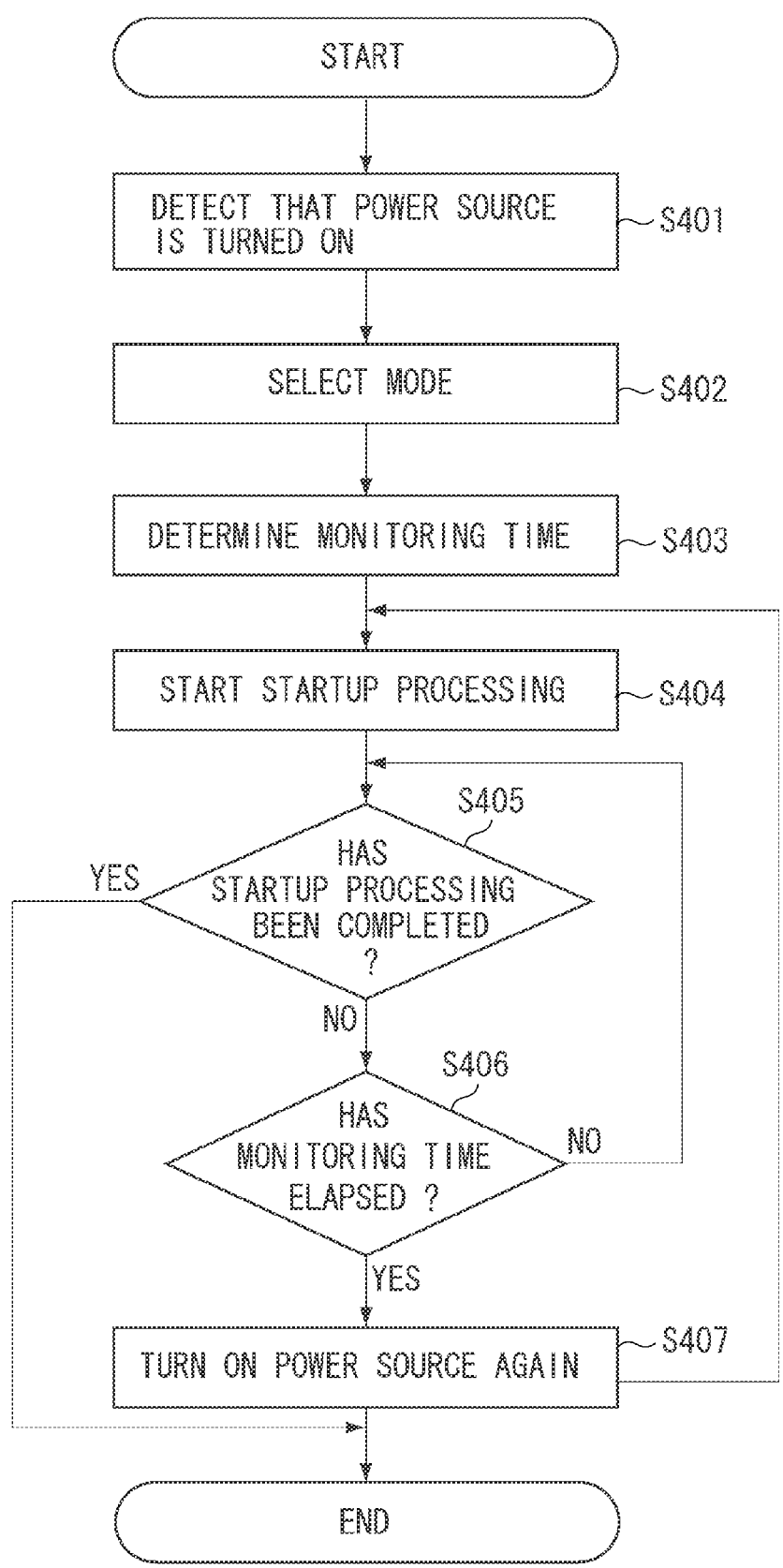
FIG. 4 is a flowchart illustrating power control on an image forming apparatus according to a first exemplary embodiment.

FIG. 4 is a flowchart illustrating power control on the image forming apparatus according to the first exemplary embodiment. Each step indicated in the flowchart is realized by causing the CPU 201 to load a control program stored in the ROM 202 into the memory 203 to execute it. Further, a part of the steps indicated in the flowchart is realized by causing the power source control unit 210 to execute it under the control of the CPU 201.

First, in step S401, the power source control unit 210 detects that the power source switch 211 has been turned on. In step S401, the power source on the image forming apparatus 1 is turned on.

Next, in step S402, the CPU 201 accesses the nonvolatile memory 205 to select a mode of startup processing. The mode of startup processing is selected by confirming whether the startup processing on the image forming apparatus 1 is the first time.

The nonvolatile memory 205 stores initialization information indicating that initialization processing, which is needed in the first startup of the image forming apparatus 1 when the image forming apparatus 1 is manufactured, is not still completed. Then, the initialization information is erased when initialization processing, which is needed in the first startup of the image forming apparatus 1, is normally completed.

When the initialization information is stored in the nonvolatile memory 205, in other words, when startup processing of the image forming apparatus 1 is the first time, the initialization mode is selected as the mode of startup processing. When the initialization information is not stored in the nonvolatile memory 205, in other words, when startup processing of the image forming apparatus 1 is not the first time, the normal mode is selected as the mode of startup processing.

Next, in step S403, the CPU 201 accesses the nonvolatile memory 205 and determines monitoring time corresponding to the mode selected in step S402 by referring to the table illustrated in FIG. 3A. The determined monitoring time is set to the timer 212. The timer 212 starts subtraction of time from the set monitoring time. The determined monitoring time may be set to the timer 212. Then, the timer 212 may also start addition of time from zero.

Next, in step S404, the CPU 201 starts the startup processing of the image forming apparatus 1 in the mode selected in step S402. In the startup processing in the normal mode, the CPU 201 executes startup of various types of software to be used in the image forming apparatus 1, startup of various types of hardware included in the image forming apparatus 1, and the like. In the startup processing in the initialization mode, in addition to the startup processing in the normal mode, the CPU 201 executes initialization processing (e.g., setup of software and hardware to be used in the image forming apparatus 1) which is needed in the first startup of the image forming apparatus 1.

Next, in step S405, the power source control unit 210 determines whether the startup processing started in step S404 has been completed. When it is determined that the startup processing has been completed (YES in step S405), the processing ends. When it is determined that the startup processing has not been completed (NO in step S405), the processing proceeds to step S406.

When it is determined that the startup processing has not been completed in step S405, then in step S406, the power source control unit 210 determines whether monitoring time determined in step S403 has elapsed. When it is determined that the monitoring time has elapsed (YES in step S406) (in other words, when it is determined that startup processing has not been completed within the monitoring time), the processing proceeds to step S407.

When it is determined that the monitoring time has not elapsed (NO in step S406), the processing returns to step S405. Whenever it is determined that the monitoring time has elapsed in step S406, a frequency thereof may be counted. When the frequency becomes equal to or larger than a predetermined frequency, display of an error is output on an operation screen on the operation unit 5 and then, the processing may end.

When it is determined that the monitoring time has elapsed (YES in step S406) (in other words, when it is determined that startup processing has not been completed within the monitoring time), in step S407, the power source control unit 210 turns on the power source again on the image forming apparatus 1. Turning on the power source again in step S407 may include turning off and on of the power source on the image forming apparatus 1. After step S407, the processing returns to step S404.

According to the present invention, suitable monitoring time can be determined corresponding to a mode of startup processing when a power source on an information processing apparatus is turned on, and the startup processing can be executed again when the startup processing has not been completed within the monitoring time.

For example, when a mode short in processing time is selected, monitoring time is determined so as to be made short. Thus, when startup processing is stopped on the way, the startup processing can be swiftly executed again.

Further, for example, when a mode long in processing time is selected, monitoring time is determined so as to be made long. Thus, this can prevent startup processing from being executed again regardless of that the startup processing is normally executed.

In a second exemplary embodiment, power control when a power source is turned off, in other words, power control from when the power source is turned on (first power supply state) to when the power source is turned off (second power supply state) on an image forming apparatus will be described.

Figure 5:
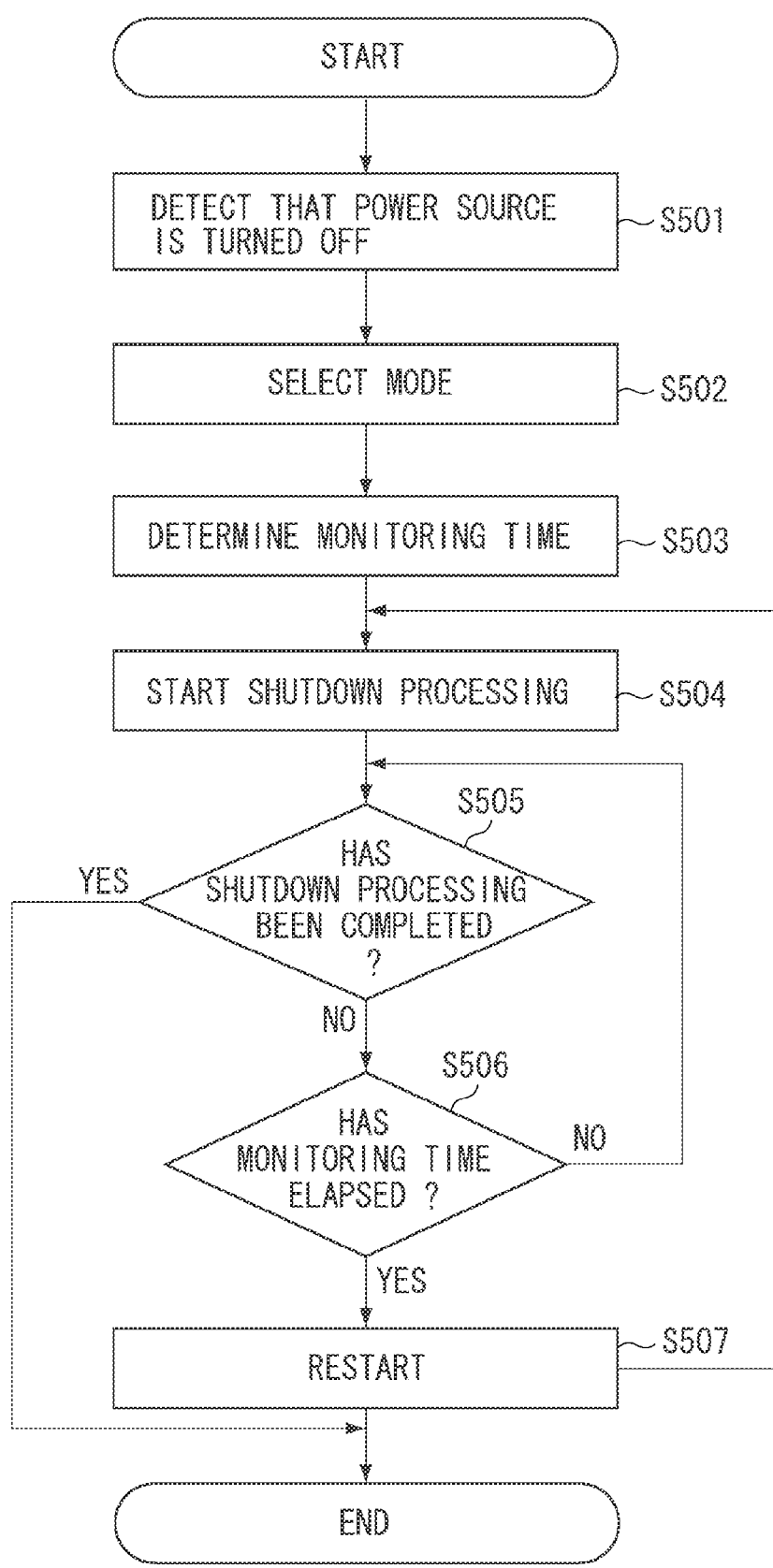
FIG. 5 is a flowchart illustrating power control on an image forming apparatus according to a second exemplary embodiment.

FIG. 5 is a flowchart illustrating power control on the image forming apparatus according to the second exemplary embodiment. Each step indicated in the flowchart is realized by causing the CPU 201 to load a control program stored in the ROM 202 into the memory 203 to execute it. Further, a part of the steps indicated in the flowchart is realized by causing the power source control unit 210 to execute it under the control of the CPU 201.

First, in step 5501, the CPU 201 detects that the power source switch 211 has been turned off.

Next, in step S502, the CPU 201 accesses the nonvolatile memory 205 to select a mode of shutdown processing. The mode of shutdown processing is selected by confirming whether complete erasure of data and recovery of mirroring are set (or executed) when the shutdown processing is executed. When complete erasure of data is set (or executed), the nonvolatile memory 205 stores complete erasure information indicating that effect. Then, the complete erasure information is erased when complete erasure of data has been cancelled (or completed).

When recovery of mirroring is set (or executed), the nonvolatile memory 205 stores recovery information indicating that effect. Then, the recovery information is erased when recovery of mirroring has been cancelled (or completed). When the nonvolatile memory 205 stores the complete erasure information, in other words, when complete erasure of data is set (or executed) in executing the shutdown processing, the complete erasure mode is selected as the mode of shutdown processing.

When the nonvolatile memory 205 stores the recovery information, in other words, when recovery of mirroring is set (or executed) in executing the shutdown processing, the recovery mode is selected as the mode of shutdown processing.

When the nonvolatile memory 205 does not store the complete erasure information and the recovery information, in other words, when complete erasure of dada and recovery of mirroring are not set (or executed) in executing the shutdown processing, the normal mode is selected as the mode of shutdown processing.

Next, in step S503, the CPU 201 accesses the nonvolatile memory 205 and determines monitoring time corresponding to the mode selected in step S502 by referring to the table illustrated in FIG. 3B. The determined monitoring time is set to the timer 212. The timer 212 starts subtraction of time from the set monitoring time. The determined monitoring time may be set to the timer 212. Then, the timer 212 may also start addition of time from zero.

Next, in step S504, the CPU 201 starts the shutdown processing of the image forming apparatus 1 in the mode selected in step S502. In the shutdown processing in the normal mode, the CPU 201 executes storage of various settings of the image forming apparatus 1, termination of various types of software used in the image forming apparatus 1, and termination of various types of hardware included in the image forming apparatus 1. In the shutdown processing in the complete erasure mode, in addition to shutdown processing in the normal mode, the CPU 201 executes complete erasure of data on the HDD 6. In the shutdown processing in the recovery mode, in addition to shutdown processing in the normal mode, the CPU 201 executes recovery of mirroring on the HDD 6.

Next, in step S505, the power source control unit 210 determines whether the shutdown processing started in step S504 has been completed. When it is determined that the shutdown processing has been completed (YES in step S505), the power source on the image forming apparatus 1 is turned off. Then, the processing ends. When it is determined that shutdown processing has not been completed (NO in step S505), the processing proceeds to step S506.

When it is determined that shutdown processing has not been completed in step S505, then in step S506, the power source control unit 210 determines whether monitoring time determined in step S503 has elapsed. When it is determined that the monitoring time has elapsed (YES in step S506) (in other words, when it is determined that the shutdown processing has not been completed within the monitoring time), the processing proceeds to step S507. When it is determined that the monitoring time has not elapsed (NO in step S506), the processing returns to step S505.

Whenever it is determined that the monitoring time has elapsed in step S506, a frequency thereof may be counted. When the frequency becomes equal to or larger than a predetermined frequency, display of an error is output on the operation screen on the operation unit 5 and then, the processing may end. Further, in step S506, when it is determined that the monitoring time has elapsed, the power source on the image forming apparatus 1 is turned off. Then, the processing may end.

In step S506, when it is determined that the monitoring time has elapsed (in other words, when it is determined that the shutdown processing has not been completed within the monitoring time), then in step S507, the power source control unit 210 restarts the image forming apparatus 1. Restart of the apparatus in step S507 may include turning off and on of the power source on the image forming apparatus 1 and the startup processing of the image forming apparatus 1. After step S507, the processing returns to step S504.

According to the present invention, suitable monitoring time can be determined corresponding to a mode of shutdown processing when a power source on an information processing apparatus is turned off, and shutdown processing can be executed again when the shutdown processing has not been completed within the monitoring time.

For example, when a mode short in processing time is selected, monitoring time is determined so as to be made short. Thus, when shutdown processing is stopped on the way, the shutdown processing can be swiftly executed again.

Further, for example, when a mode long in processing time is selected, monitoring time is determined so as to be made long. Thus, this can prevent shutdown processing from being executed again regardless of that the shutdown processing is normally executed.

In a third exemplary embodiment, power control in shifting to power saving in an image forming apparatus, in other words, power control from a normal operation (first power supply state) to a power saving operation (second power supply state) will be described. Further, in the present exemplary embodiment, power control in returning from power saving in the image forming apparatus, in other words, power control from the power saving operation (first power supply state) to the normal operation (second power supply state) will be described.

Figure 6:
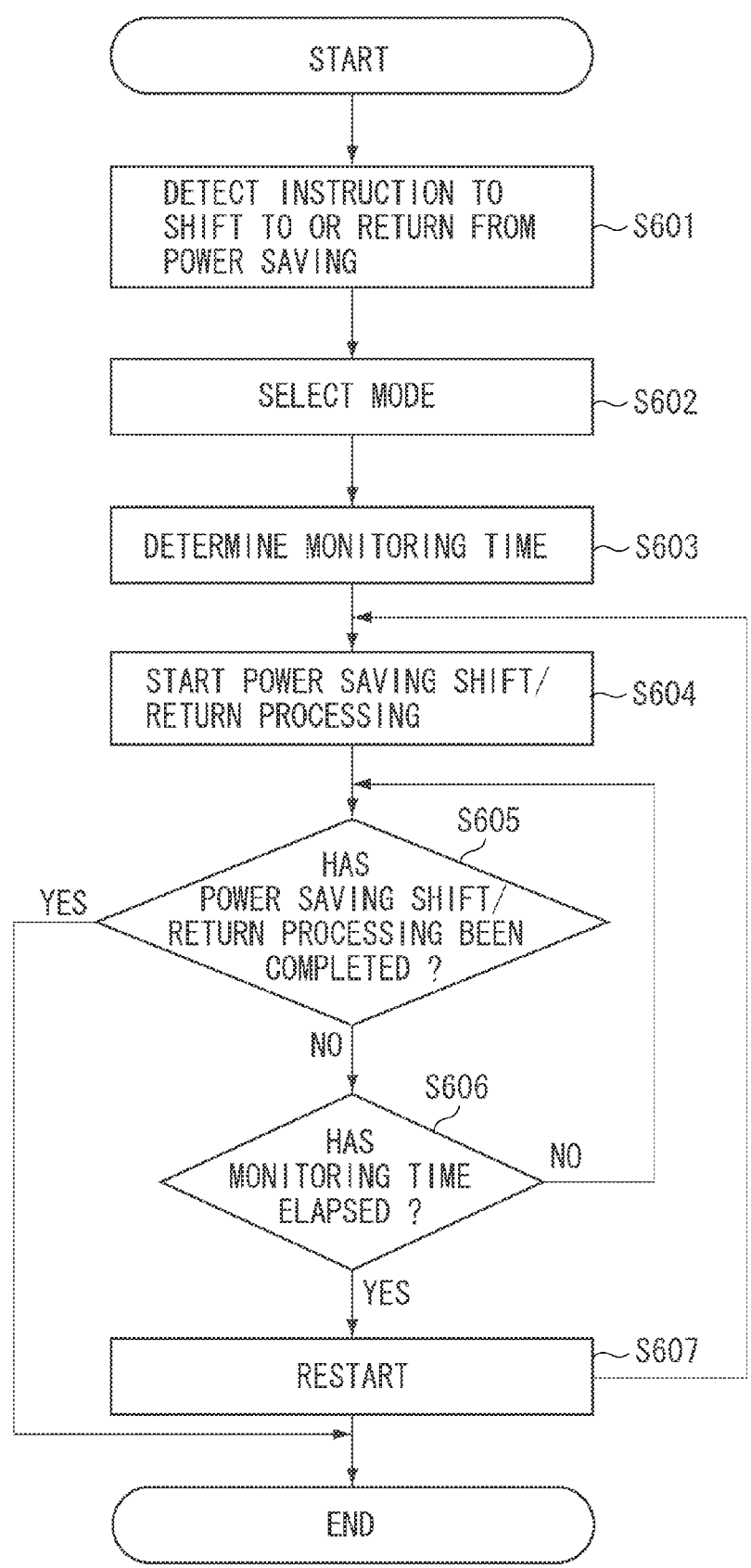
FIG. 6 is a flowchart illustrating power control on an image forming apparatus according to a third exemplary embodiment.

FIG. 6 is a flowchart illustrating power control on the image forming apparatus according to the third exemplary embodiment. Each step indicated in the flowchart is realized by causing the CPU 201 to load a control program stored in the ROM 202 into the memory 203 to execute it. Further, a part of the steps indicated in the flowchart is realized by causing the power source control unit 210 to execute it under the control of the CPU 201.

In this specification, power saving shift/return processing refers to power saving shift processing or power saving return processing. The power saving shift processing is processing in which the power supply state of the image forming apparatus 1 is shifted from the normal state to a power saving state. Further, the power saving return processing is processing in which the power supply state of the image forming apparatus 1 is shifted from the power saving state to the normal state.

The normal state is a state in which electric power is supplied to the all components of the image forming apparatus 1. Further, the power saving state is a state in which electric power is supplied to some components of the image forming apparatus 1 and is not supplied to components other than that. In FIG. 6, some components of the image forming apparatus 1 include at least the power source control unit 210 and the timer 212.

First, in step S601, the CPU 201 detects an instruction to shift to or return from the power saving state. The instruction to shift to or return from the power saving state is detected when a power saving shift/return button on the operation unit 5 has been pressed, or predetermined time has elapsed from input of a job.

Next, in step S602, the CPU 201 accesses the nonvolatile memory 205 to select a mode of power saving shift/return processing. The mode of power saving shift/return processing is selected by confirming whether temperature regulation and calibration are set (or executed) when the power saving shift/return processing is executed.

When the temperature regulation is set (or executed), the nonvolatile memory 205 stores temperature regulation information indicating that effect. Then, the temperature regulation information is erased when the temperature regulation has been cancelled (or completed). When the calibration is set (or executed, the nonvolatile memory 205 stores calibration information indicating that effect. Then, the calibration information is erased when the calibration has been cancelled (or completed).

When the nonvolatile memory 205 stores the temperature regulation information, in other words, when the temperature regulation is set (or executed) in executing the power saving shift/return processing, the temperature regulation mode is selected as the mode of power saving shift/return processing.

When the nonvolatile memory 205 stores the calibration information, in other words, when the calibration is set (or executed) in executing the power saving shift/return processing, the calibration mode is selected as the mode of power saving shift/return processing.

When the nonvolatile memory 205 does not store the temperature regulation information and the calibration information, in other words, when the temperature regulation and the calibration are not set (or executed) in executing the power saving shift/return processing, the normal mode is selected as the mode of power saving shift/return processing.

Next, in step S603, the CPU 201 accesses the nonvolatile memory 205 and determines monitoring time corresponding to the mode selected in step S602 by referring to the table illustrated in FIG. 3C. The determined monitoring time is set to the timer 212. The timer 212 starts subtraction of time from the set monitoring time. The determined monitoring time may be set to the timer 212. Then, the timer 212 may also start addition of time from zero.

Next, in step S604, the CPU 201 starts the power saving shift/return processing on the image forming apparatus 1 in the mode selected in step S602. In the power saving shift/return processing in the normal mode, storage/reading of various types of data on the image forming apparatus 1, stop/restart of power supply to some components of the image forming apparatus 1, and the like are executed. In the power saving shift/return processing in the temperature regulation mode, in addition to the power saving shift/return processing in the normal mode, the temperature regulation or the like on the printer device 4 is executed. In the power saving shift/return processing in the calibration mode, in addition to the power saving shift/return processing in the normal mode, the calibration or the like on the printer device 4 is executed.

Next, in step S605, the power source control unit 210 determines whether the power saving shift/return processing started in step S604 has been completed. When it is determined that the power saving shift/return processing has been completed (YES in step S605), the processing ends. When it is determined that the power saving shift/return processing has not been completed (NO in step S605), the processing proceeds to step S606.

In step S605, when it is determined that the power saving shift/return processing has not been completed, then in step S606, the power source control unit 210 determines whether monitoring time determined in step S603 has elapsed. When it is determined that the monitoring time has elapsed (YES in step S606) (in other words, when it is determined that the power saving shift/return processing has not been completed within the monitoring time), the processing proceeds to step S607. When it is determined that the monitoring time has not elapsed (NO in step S606), the processing returns to step S605.

In step S606, whenever it is determined that the monitoring time has elapsed, a frequency thereof may be counted. When the frequency becomes equal to or larger than a predetermined frequency, display of an error is output on the operation screen on the operation unit 5 and the processing may end.

In step S606, when it is determined that the monitoring time has elapsed (in other words, when it is determined that the power saving shift/return processing has not been completed within the monitoring time), in step S607, the power source control unit 210 restarts the image forming apparatus 1. Restart of the apparatus in step S607 may include turning off and on of the power source on the image forming apparatus 1 and the startup processing of the image forming apparatus 1. After step S607, the processing returns to step S604. When the power supply state is already in the state after shifting to or returning from power saving in step S607, the processing in step S604 may be omitted.

According to the present invention, suitable monitoring time can be determined corresponding to a mode of power saving shift/return processing in executing power saving shift/return, and the power saving shift/return processing can be executed again when the power saving shift/return processing has not been completed within the monitoring time.

For example, when a mode short in processing time is selected, monitoring time is determined so as to be made short. Thus, when power saving shift/return processing is stopped on the way, the power saving shift/return processing can be swiftly executed again.

Further, for example, when a mode long in processing time is selected, monitoring time is determined so as to be made long. Thus, this can prevent power saving shift/return processing from being executed again regardless of that the power saving shift/return processing is normally executed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus including a first power state and a second power state in which power consumption is less than that in the first power state, the information processing apparatus comprising:
   a memory for storing data and a computer program; and
   a processor coupled to the memory for executing the computer program, the computer program comprising instructions for:
   selecting a mode of shutdown processing of the information processing apparatus;
   determining time necessary for executing the shutdown processing in the mode selected;
   executing the shutdown processing in the mode selected; and
   forcibly turning off power of the information processing apparatus in a case where shutdown execution fails to complete the shutdown processing within the time determined,
   wherein the mode of shutdown processing includes at least either one of a complete erasure mode for erasing date stored in a storage unit and a normal mode in which the complete erasure of data is not executed.

2. The information processing apparatus according to claim 1, wherein the computer program determines the time in a case where the complete erasure mode is selected to become longer than the time in a case where the normal mode is selected.

3. The information processing apparatus according to claim 1, wherein the information processing apparatus restarts after the power of the information processing apparatus is forcibly turned off.

4. The information processing apparatus according to claim 3, wherein shutdown processing of the information processing apparatus is executed again after the control unit has restarted the information processing apparatus.

5. The information processing apparatus according to claim 1, further comprising a storage unit configured to store information indicating the mode,
   wherein the computer program selects a mode indicated by the information stored by the storage unit.

6. The information processing apparatus according to claim 1, further comprising a storage unit configured to store correspondence between the mode and the time,
   wherein the computer program refers to the correspondence stored in the storage unit to determine the time.

7. An information processing method comprising:
   selecting a mode of shutdown processing for an information processing apparatus, wherein in a power consumption in a second power state is less than that in a first power state of the information processing apparatus;
   determining time necessary for executing the shutdown processing in the selected mode;
   executing the shutdown processing in the selected mode; and
   forcibly turning off power of the information processing apparatus in a case where shutdown execution fails to complete the shutdown processing within the time determined,
   wherein the mode of shutdown processing includes at least either one of a complete erasure mode for erasing date stored in a storage unit and a normal mode in which the complete erasure of data is not executed.

8. One or more non-transitory computer-readable media storing instructions that, when executed by one or more computing devices, cause the one or more computing devices to perform operations comprising:
   selecting a mode of shutdown processing or a mode of return processing, for an information processing apparatus, wherein in a power consumption in a second power state is less than that in a first power state of the information processing apparatus;
   determining time necessary for executing the shutdown processing in the selected mode;
   executing the shutdown processing or the return processing in the selected mode; and
   forcibly turning off power of the information processing apparatus in a case where the shutdown processing or the return processing is not completed within the determined time,
      wherein the mode of shutdown processing includes at least either one of a complete erasure mode for erasing date stored in a storage unit and a normal mode in which the complete erasure of data is not executed.

* * * * *